United States Patent
Hughes (10) Patent No.: US 6,718,170 B1
(45) Date of Patent: Apr. 6, 2004

(54) DYNAMIC ALLOCATION OF MICROPROCESSOR RESOURCES IN A WIRELESS COMMUNICATION DEVICE

(75) Inventor: Robbin D. Hughes, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/346,369

(22) Filed: Jul. 1, 1999

(51) Int. Cl.[7] ................................................. H04Q 7/20
(52) U.S. Cl. ..................... 455/450; 455/456.1; 455/457; 455/63; 370/310; 370/320; 370/342
(58) Field of Search ............................... 455/434, 515, 455/450, 509, 512, 67.1, 63, 65, 556.1, 557; 375/141, 147, 148; 370/320, 431, 468; 709/102, 104, 105, 103, 224, 225; 713/322, 323

(56) References Cited

U.S. PATENT DOCUMENTS

| | | | | | |
|---|---|---|---|---|---|
| 5,168,556 | A | * | 12/1992 | Ajtai | 395/325 |
| 5,249,290 | A | * | 9/1993 | Heizer | 395/650 |
| 5,490,165 | A | * | 2/1996 | Blakeney et al. | 375/205 |
| 5,710,768 | A | * | 1/1998 | Ziv et al. | 370/342 |
| 5,726,982 | A | * | 3/1998 | Witter | 370/335 |
| 5,794,036 | A | * | 8/1998 | Gomi et al. | 395/675 |
| 5,805,648 | A | * | 9/1998 | Sutton | |
| 5,835,490 | A | * | 11/1998 | Park et al. | 370/342 |
| 5,867,527 | A | * | 2/1999 | Ziv et al. | |
| 5,964,840 | A | * | 10/1999 | Stevens et al. | 709/235 |
| 6,044,105 | A | * | 3/2000 | Gronemeyer | 375/152 |
| 6,112,055 | A | * | 8/2000 | Bennett et al. | |
| 6,115,408 | A | * | 9/2000 | Gendel et al. | |
| 6,151,499 | A | * | 11/2000 | Vudali et al. | 455/433 |
| 6,173,187 | B1 | * | 1/2001 | Salonaho et al. | 455/453 |
| 6,175,561 | B1 | * | 1/2001 | Storm et al. | 370/342 |
| 6,263,010 | B1 | * | 7/2001 | Naruse et al. | |
| 6,320,849 | B1 | * | 11/2001 | Hughes et al. | 370/310 |
| 6,405,045 | B1 | * | 6/2002 | Choi et al. | 455/453 |
| 6,421,369 | B1 | * | 7/2002 | Iwaskai et al. | 375/130 |
| 6,438,374 | B1 | * | 8/2002 | Bhat | 455/423 |
| 6,442,139 | B1 | * | 8/2002 | Hosein | 370/236 |
| 6,445,728 | B1 | * | 9/2002 | Byun | 375/142 |
| 6,535,736 | B1 | * | 3/2003 | Balogh et al. | 455/434 |

* cited by examiner

Primary Examiner—Charles Appiah
Assistant Examiner—Khawar Iqbal
(74) Attorney, Agent, or Firm—Philip Wadsworth; Charles D. Brown; Donald C. Kordich (57) ABSTRACT

Microprocessor resources controlling a searching process and other functions in a wireless remote unit are allocated to maintain the link while allowing sufficient microprocessor resources to be allocated to other remote unit functions. A current search rate limit is increase if the microprocessor is not overloaded and the current search rate limit is less than an higher upper limit. The current search rate limit is decreased if the microprocessor is overloaded and the current search rate limit is greater than a lower upper limit. The priority of other tasks is adjusted if the microprocessor is overloaded and the current search rate limit is equal to the lower upper limit.

16 Claims, 7 Drawing Sheets

PRIOR ART

| PRIORITY | TASK |
|---|---|
| 1 | TASK A |
| 1 | B |
| 2 | C |
| 3 | D |
| 3 | E |
| 3 | F |
| 4 | G |
| 4 | H |
| 9 | X |
| 10 | Y |
| 10 | Z |

DYNAMIC ALLOCATION OF MICROPROCESSOR RESOURCES IN A WIRELESS COMMUNICATION DEVICE

CROSS REFERENCE TO RELATED APPLICATIONS

The subject matter of U.S. Pat. No. 6,320,849, entitled "Dynamic Control of Search Duration in a Wireless Communication Device" is related to this application and is hereby incorporated by reference.

FIELD OF THE INVENTION

The invention relates to communications telephone systems. In particular, the invention relates to allocation of microprocessor resources in a wireless communication system.

BACKGROUND OF THE INVENTION

Figure 1:
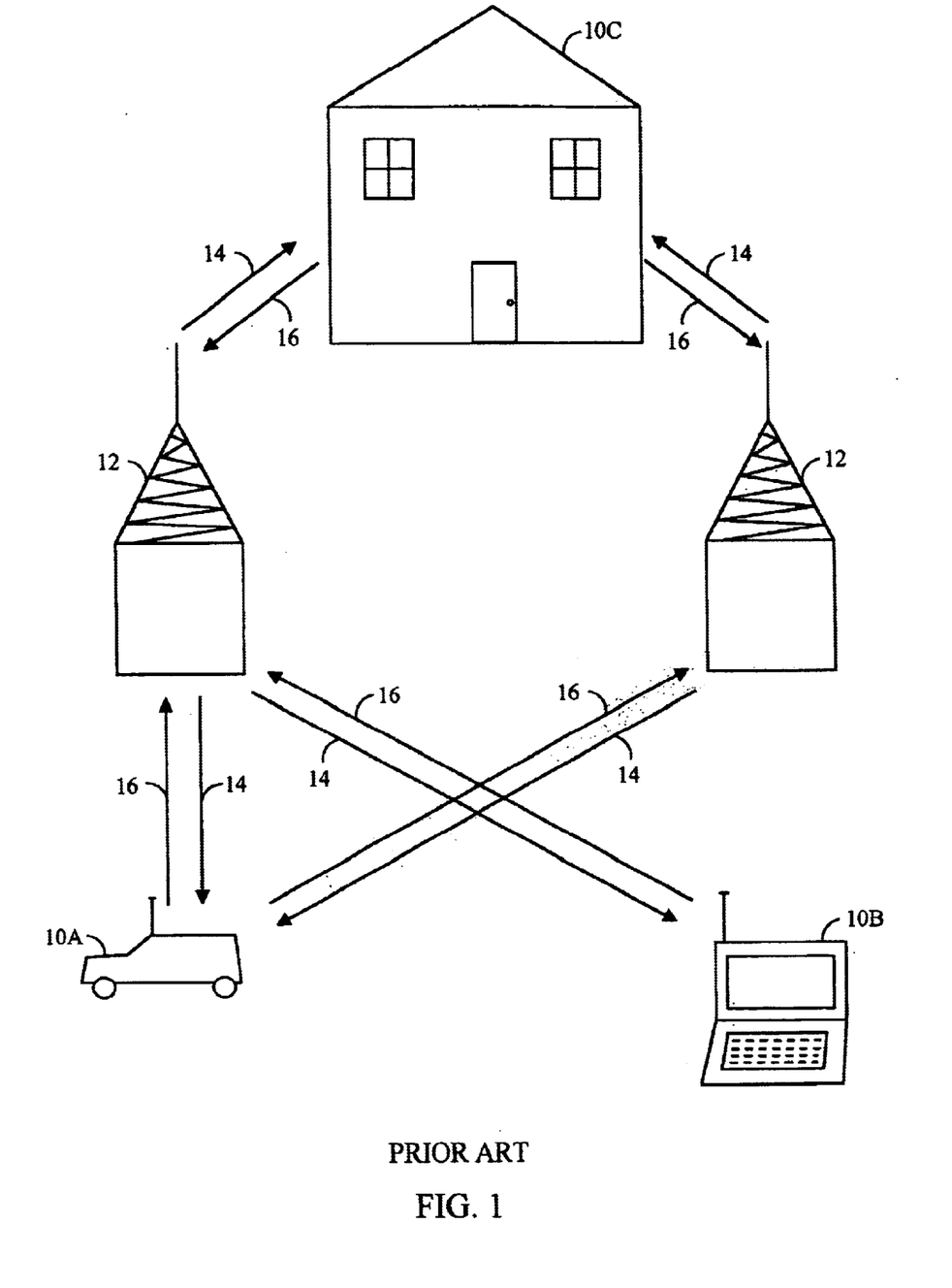
FIG. 1 is a representative diagram showing a typical modem wireless communication system.

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, handheld personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here as IS-95), the contents of which are incorporated herein by reference. Additional information concerning a CDMA communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it is transmitted between base stations and remote units. The signal generated by the multipath characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal is received at the output of the channel because the two signals, being equal amplitude and opposite phase, cancel each other. Thus, fading may have a severe negative effect on the performance of a wireless communication system.

A CDMA communications system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In the remote unit, a microprocessor is used to assign demodulation elements to the available multipath signal instances. A search engine is used to provide data to the microprocessor concerning the multipath components of the received signal. The search engine measures the arrival time and amplitude of the multipath components of a pilot signal transmitted by the base stations. The effect of the multipath environment is the same on the pilot signal and the data signal. Determining the multipath environment's effect on the pilot signal allows the microprocessor to assign demodulation elements to the data channel multipath signal instances.

The search engine determines the multipath components of the pilot signal by "searching" through a sequence of potential path offsets and measuring the energy of the pilot signal received at each of the potential path offsets. The microprocessor evaluates the energy associated with a potential offset, and, if it exceeds a certain threshold, assigns a signal demodulation element to that offset. A method and apparatus of demodulation element assignment based on searcher energy levels is disclosed in U.S. Pat. No. 5,490,165 entitled "DEMODULATION ELEMENT ASSIGNMENT IN A SYSTEM CAPABLE OF RECEIVING MULTIPLE SIGNALS", assigned to the assignee of the present invention.

Figure 2:
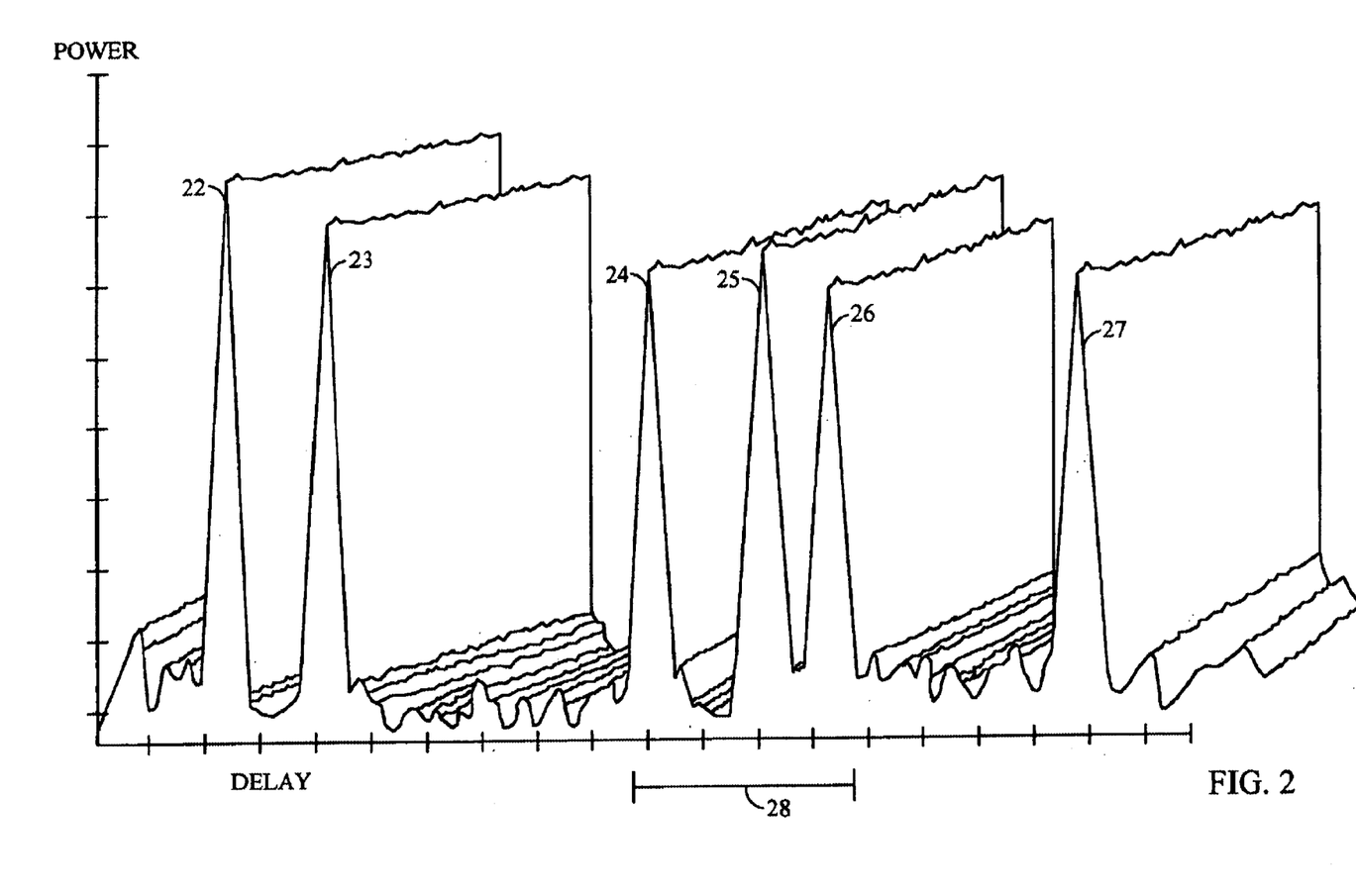
FIG. 2 is a graph showing an exemplifying set of multiple signal instances of a pilot signal from a single base station arriving at a remote unit.

FIG. 2 shows an exemplary set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22–27 has traveled a different path and therefore exhibits a different time delay, a different amplitude, and a different phase response. The six different signal spikes represented by spikes 22–27 are representative of a severe multipath environment. Typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22–27 for potential demodulation element assignment.

Note, as shown in FIG. 2, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time. The system microprocessor steps the search engine through a set of offsets, called a search window, that is likely to contain one or more multipath signal peaks suitable for assignment to a demodulation element. For each offset, the search engine reports the energy it found at that offset back to microprocessor. Demodulation elements may then be assigned by microprocessor to the paths identified by the search engine (i.e. the timing reference of their PN generators is moved to align it to that of the found path). Once a demodulation element has locked onto the signal at its assigned offset, it then tracks that path on its own without microprocessor supervision, until the path fades away or until the demodulation element is assigned to another path by the microprocessor.

In a communication system based on the industry standard for CDMA, IS-95, each of the multiple base stations transmits a pilot signal having a common PN sequence. Each base station transmits the pilot signal offset in time from neighboring base stations so that the signals can be distinguished from one another at the remote unit. At any given time, the remote unit may receive a variety of signals from multiple base stations. Using a copy of the PN sequence, which is generated at the remote unit, the entire PN space can be searched by the remote unit. Using the search results, the microprocessor distinguishes the multiple base stations based on the time offset.

Figure 3:
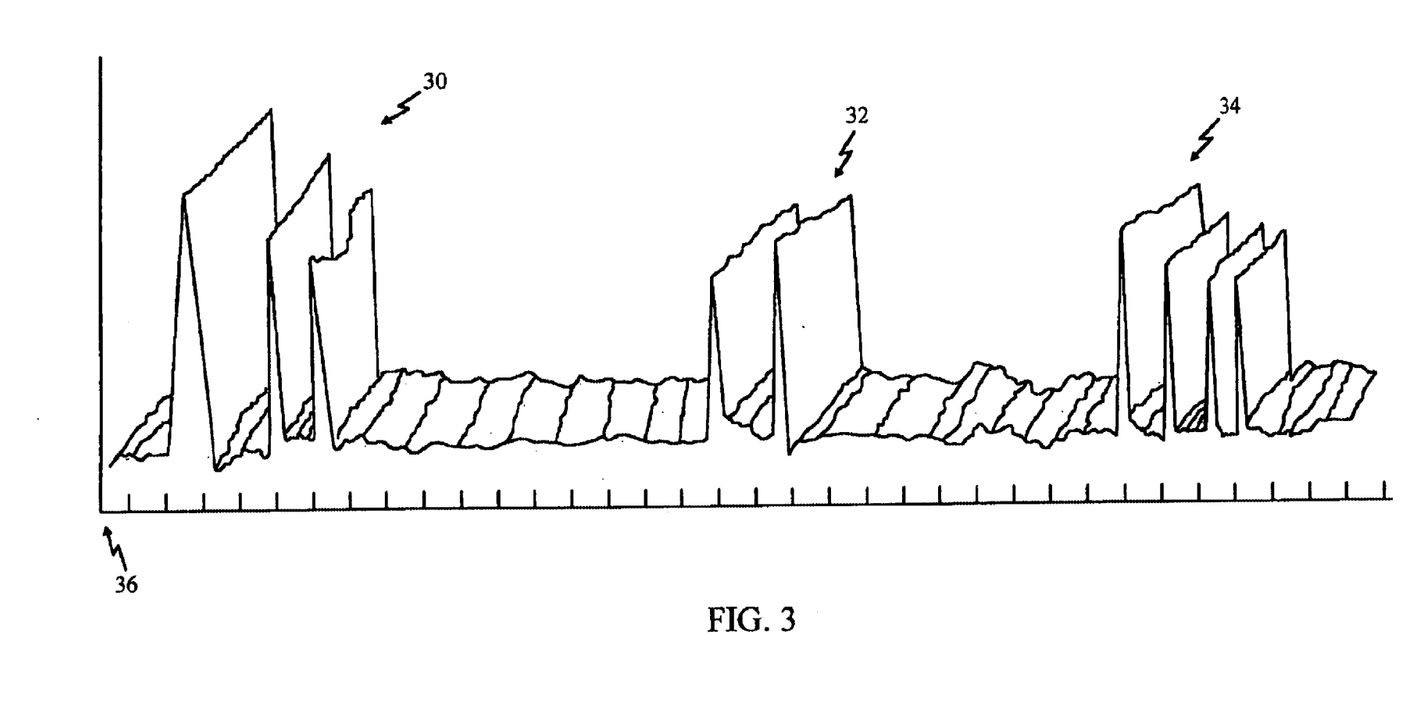
FIG. 3 is a graph showing an exemplifying set of multiple signal instances of pilot signals from multiple base stations arriving at a remote unit.

FIG. 3 shows an extended portion of PN space on the horizontal axis. The groups of peaks 30, 32 and 34 represent transmissions from three different base stations. As is seen, the signal from each base station signal experiences a different multipath environment. Also, each base station has a different PN offset from the PN reference 36. Thus, the microprocessor may select a set of PN offsets corresponding to a search window for any of the identified base stations. This allows the remote unit to simultaneously demodulate signals from multiple base stations by assigning demodulation elements appropriately.

One purpose of the search engine, as described above, is to aid in maintaining the wireless link between the remote unit and a base station. Because the wireless channel is constantly changing, multi-path searching must be performed on a virtually continuous basis, otherwise the wireless link may be lost due to, for example, fading. If the wireless link is lost, communications between the remote unit and the base station are terminated. Therefore, the search engine is assigned a relatively high priority in the hierarchy of tasks competing for resources of the microprocessor.

However, other tasks required to support data transfer over the wireless link also require the allocation of resources of the microprocessor. For example, in a typical remote unit, the transfer of voice signals requires the allocation of some of the resources of the microprocessor. In addition, some remote units support data services such as, for example, the transfer of digital data for an internet connection or facsimile transmission. A companion data services standard for an IS-95 system is disclosed in IS-707 entitled "Data Services. Options for Wideband Spread Spectrum Systems." According to IS-707, data services are implemented through the use of a radio link protocol (RLP) which error detection, error correction, flow control, and retransmission request, retransmission response. Typically, the support of the data services functions requires even more intensive allocation of microprocessor resources than the voice service functions.

In addition to multi-path searching and voice end data transmission, other lower priority tasks in the remote unit also require microprocessor resources. These lower priority tasks may include updating the display and receiving user input as well as many other functions. Thus, some minimum amount of the microprocessor resources should be allocated among these tasks to maintain proper operation of the overall remote unit.

Thus, in a remote unit, the tasks associated with link maintenance (such as searching), the tasks associated with data transfer (such as voice or data services) and the other remote unit tasks must share the available microprocessor resources. Without a proper allocation of microprocessor resources among these tasks, the remote unit cannot operate properly.

Therefore, there is a need in the art for a method of and apparatus for allocating microprocessor resources in a remote unit of a wireless communication system.

SUMMARY OF THE INVENTION

The invention improves the efficiency of the allocation of resources of a microprocessor in a remote unit in a wireless communication system. According to the invention, the search rate limit of the remote unit is varied in response to microprocessor loading. In general, as the search rate increases, the loading of the microprocessor increases. By limiting the search rate, the amount of microprocessor resources allocated to the searching process can be decreased, thus allowing other functions within the remote unit to have access to the microprocessor resources. The search rate can be reduced by the introduction of delay within the searching process.

According to one embodiment of the invention, initially the introduced delay is set equal to zero and the current search rate limit is set equal to a higher upper search rate limit. The microprocessor generates the desired search parameters and forwards them to a search engine. The current search rate and microprocessor loading are determined. If the microprocessor is not overloaded and the current search rate limit is less than the upper search rate limit, the current search rate limit is increased. If the microprocessor is overloaded and the current search rate limit is greater than a lower upper search rate limit, the current search rate limit is decreased. If the microprocessor is overloaded and the current search rate limit is equal to the lower upper search rate limit, the task priority of the lower priority tasks is adjusted. In any case, if the current search rate is greater than the current search rate limit, additional delay is inserted into the searching process in order to reduce the search rate. If the current search rate is less than the current search rate limit, the additional delay, if any, is decreased.

In this way, when microprocessor resources are available and the current conditions warrant, additional microprocessor resources are allocated to the searching process. When microprocessor resources are in high demand, the microprocessor resources are allocated to other functions so long as the search rate remains above the lower upper search rate limit.

BRIEF DESCRIPTION OF THE DRAWINGS

The features, objects and advantages of the present invention will become more apparent from the detailed description set forth below when taken in conjunction with the drawings in which like references characters identify correspondingly throughout, and wherein.

DETAILED DESCRIPTION OF THE INVENTION

The invention improves the allocation of microprocessor resources of a remote unit in a wireless communications system. According to the invention, microprocessor loading is measured by monitoring the number of idle tasks performed by the microprocessor. Based upon the level of loading, an upper limit to the searching rate is determined. If the search rate reaches the upper limit, delays are inserted by the microprocessor to restrict the search rate from further increasing. The upper limit is constrained to have a valve between a higher upper limit (HUL) and a lower upper limit (LUL). If the microprocessor loading is excessive, and the search rate is below the upper limit, lower priority tasks may not receive adequate microprocessor resources to function properly. To ensure that lower priority tasks receive at least a minimal amount of microprocessor resources, their priority is selectively raised.

Figure 4:
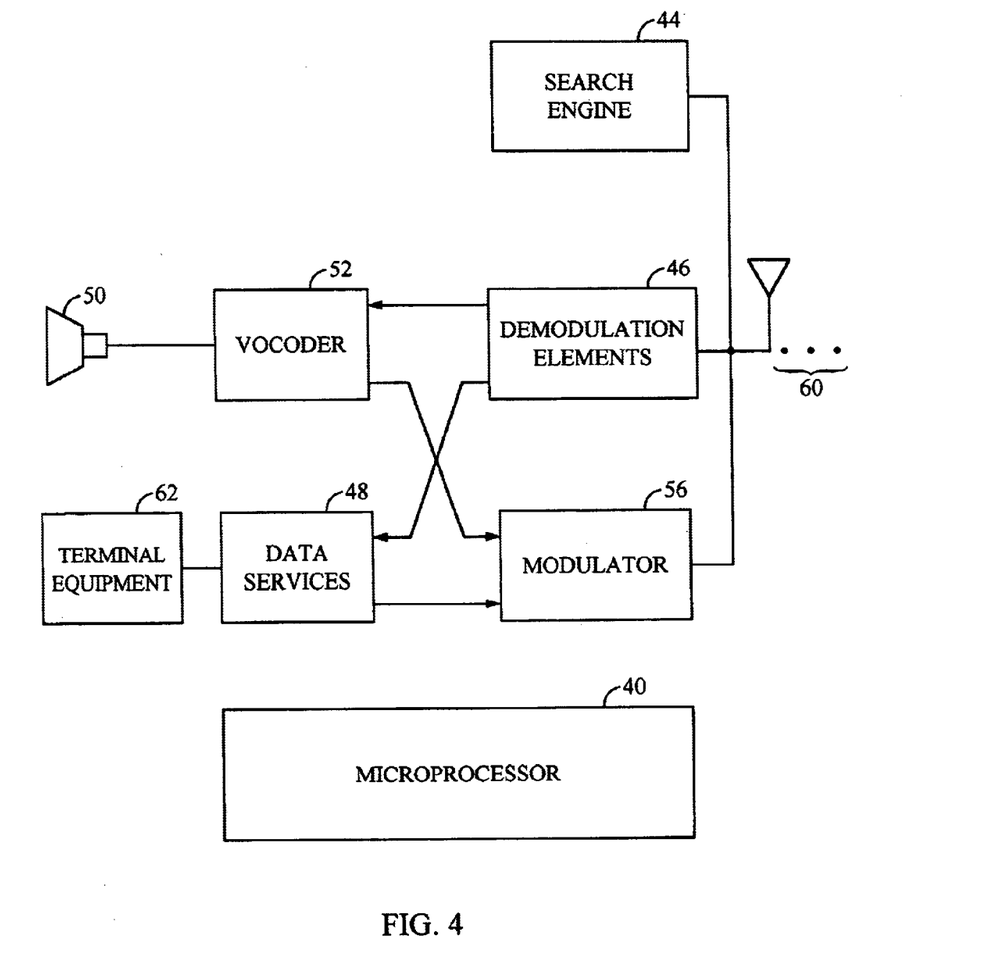
FIG. 4 is a block diagram of a remote unit.

One embodiment of the invention is described in relation to FIG. 4. In FIG. 4, a microprocessor 40 interfaces with a vocoder 52, a data services module 48, a search engine 44, a demodulation elements 46 and modulator 56. (These interconnections are not shown in FIG. 4 in order to avoid cluttering the figure.) The microprocessor 40 transfers search parameters to the search engine 44. When the search is complete, the search engine 44 transfers the results to the microprocessor 40. As described above, the search results are analyzed by the microprocessor 40 to assist in assignment of demodulation elements 46. The microprocessor 40 also transfers new search parameters to the search engine 44 for the next search. During the period that the search, engine 44 is performing the search, the microprocessor 40 can service other tasks, including those generated by the data services module 48.

If the remote unit is communicating voice information, the interface between the remote unit and the user is accomplished through the use of a speaker/microphone 50. A vocoder 52 receives analog information from the speaker/microphone 50 and converts it to digital form for transmission over wireless link 60. The vocoder 52 passes the digitized voice to the modulator 56. The modulator 56 modulates the data for transmission over a wireless link 60. When a signal containing information for output on speaker/microphone 50 arrives on the wireless link 60, the demodulation elements 46 demodulate the signal and provide it to the vocoder 52. The vocoder 52 decodes the signal and provides audible output to speaker/microphone 50. In one embodiment, the functions are each accomplished according to well known techniques such as those described in IS-95.

If the remote unit is communicating digital data, the interface between the remote unit and the user is typically accomplished through the use of terminal equipment 62. For example, the terminal equipment 62 may be a computer, fax machine or other digital terminal. In many embodiments, the terminal equipment 62 is included in a common housing with the remainder of the elements shown in FIG. 4. When the data services module 48 receives digital data for transmission over the wireless link 60 from the terminal equipment 62, it provides any required encoding and passes the encoded information to the modulator 56. The modulator 56 modulates the encoded information and provides the signal for transmission to the wireless link 60. When a signal containing information for terminal equipment 62 arrives, the demodulation elements 46 demodulate the signal and provide it to the data services module 48. The data services module 48 decodes the signal and provides the data to the terminal equipment 62.

As described above, data services supports transmission of digital data over the wireless channel. This transmission is implemented through a radio link protocol (RLP) which comprises error detection, error correction, flow control, retransmission request and retransmission response. The executing of data services requires a significant amount of microprocessor resources to perform these tasks as well as others in order to effectuate the transfer of digital data across the wireless link.

To allocate the resources of the microprocessor 40 efficiently, the current loading of the microprocessor 40 must be determined. In one embodiment microprocessor 40 loading is determined by the number of idle tasks performed by the microprocessor. If the number of idle tasks performed by the microprocessor 40 is above a threshold, the microprocessor 40 is not overloaded. If the number of idle tasks performed by the microprocessor 40 drops below a threshold, the microprocessor 40 is overloaded. According to the invention, if the microprocessor is overloaded, some microprocessor resources are diverted from the search engine 44 to support other functions. In addition, the priority of the lower priority tasks is selectively elevated to ensure minimal required resources are applied to these tasks.

Figure 5:
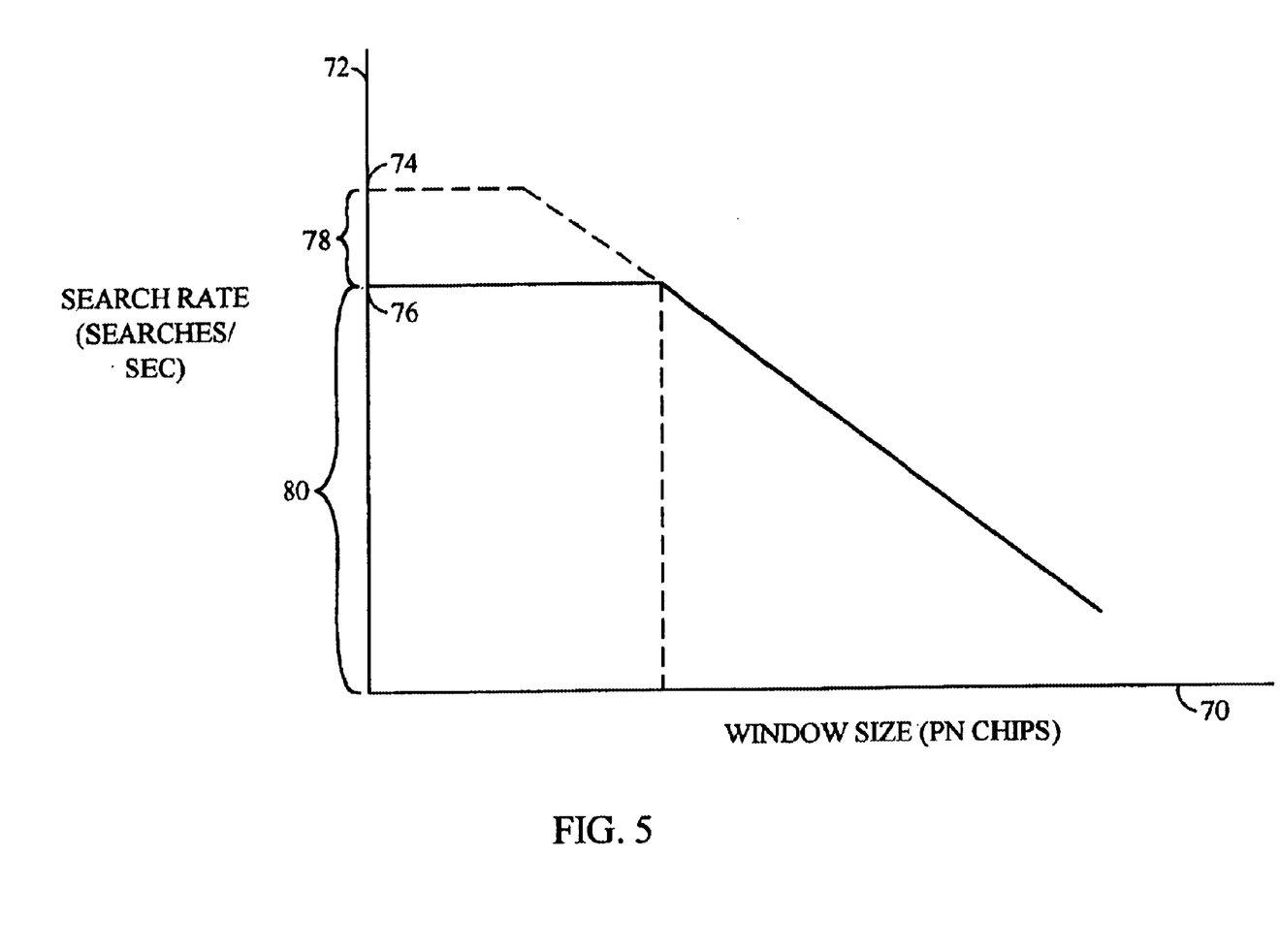
FIG. 5 is a chart showing the search rate as a function of search window size.

Allocation of resources of the microprocessor 40 to the search engine 44 is described in relation to FIG. 5. FIG. 5 shows the relationship between search rate and search window size. The horizontal axis 70 in FIG. 5 can be thought of, generally, as search window size, such as in units of PN chips or time. The vertical axis 72 in FIG. 5 represents the search rate, in complete searches per second. In general, the search rate decreases as the search window size increases because the increasing window size increases the time required to perform each search. In addition other factors, such as, for example, the integration interval and the number of non-coherent passes, also affect the search rate. Additional information concerning the effects of integration interval and number of non-coherent passes on the search rate is disclosed in the above referenced U.S. Pat. No. 6,320,849 "DYNAMIC CONTROL OF SEARCH DURATION IN A WIRELESS COMMUNICATION DEVICE."

The search rate has a maximum value, or higher upper limit (HUL) 74, which cannot be exceeded. That is, HUL 74 can be thought of as the maximum throttle value for the search rate. If the search rate attempts to exceed the HUL 74, the microprocessor 40 introduces delays to maintain this maximum throttle value. The search rate also has a lower upper limit (LUL) 76. Search results adequate to maintain the wireless link are accomplished at any search rate between the HUL 74 and the LUL 76. Search rates below the LUL 76 may jeopardize the stability of the link in the presence of certain multipath conditioning and, thus, should be avoided if the current conditions nominally warrant a high search rate. Search rates above the HUL 74 do not significantly improve search results and consume unnecessarily large amounts of microprocessor resources.

According to the invention, a current search rate limit, which the current search rate cannot exceed, is established between the HUL and LUL. The current search rate limit is dynamically adjusted between the HUL and LUL depending on microprocessor loading and the current search rate. Throughout the following discussion the HUL, LUL and current search rate limit are discussed as individual values, however these values can also be a range rather than a single value. For example, when the current search rate is said to be equal to the current search rate limit, the current search rate may be within a range of values all of which are interpreted as being equal to the current search rate limit.

If microprocessor loading increases to the point where the microprocessor is overloaded, and the current search rate limit is greater than the LUL 76, the current search rate limit can be set to a lower value, down to the LUL 76. The current search rate is set to a lower search rate, i.e., throttled by the introduction of a delay. The reduction in current search rate reduces the demands on the resources of the microprocessor made by the search engine, thus allowing more resources of the microprocessor to be allocated to other tasks.

If microprocessor loading is light, additional resources of the microprocessor can be allocated to the search engine without affecting other tasks and the search rate limit can be increased, up to HUL, if current conditions warrant. The current search rate can be throttled up to a higher search rate by reducing any delays introduced by the microprocessor. The increase in current search rate increases the demand on the resources of the microprocessor made by the search engine. However, this increase in microprocessor resources allocated to the search engine is permissible because there are sufficient microprocessor resources to satisfy the existing demand. Increasing the microprocessor resources allocated to the search engine is desirable because it improves the remote unit's ability to maintain the wireless channel.

Introduction of delays in order to throttle the search rate can be achieved through various techniques. For example, the microprocessor can insert a delay following an interrupt from the search engine indicating completion of a search before servicing the interrupt. The microprocessor 40 can command the search engine to perform a "dummy" search of a desired duration, the results of which are ignored by the microprocessor 40. The search parameters can be adjusted to increase the execution time of the search. Adjustment of search parameters may include, for example, increasing search window size, increasing the integration interval, or increasing the number of non-coherent passes such as those described in the above-referenced U.S. Pat. No. 6,320,849 entitled "DYNAMIC CONTROL OF SEARCH DURATION IN A WIRELESS COMMUNICATION DEVICE."

Figure 6:
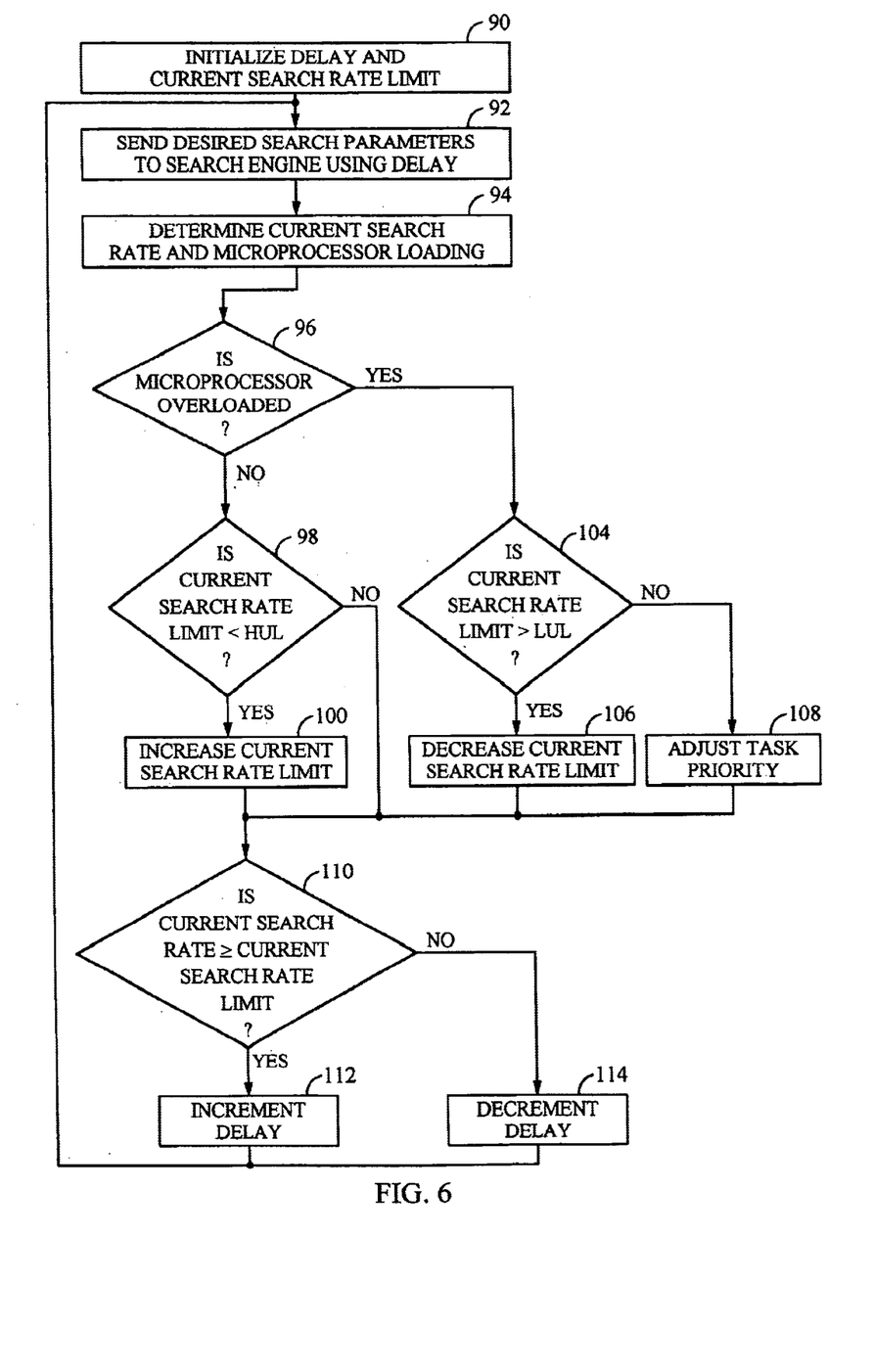
FIG. 6 is a flow chart showing operation of the dynamic throttling of the search rate.

FIG. 6 is a flow chart describing the throttling operation. In block 90, the delay and the current search rate limit are initialized. The microprocessor, in block 92, sends the desired search parameters to the searching process according to the delay. In block 94, the current search rate and the microprocessor loading are determined. In block 96, the system determines if the microprocessor is overloaded.

If the microprocessor is not overloaded, flow continues to block 98. In block 98, the system determines whether the current search rate is less than the HUL, thus indicating whether additional microprocessor resources can be allocated to the searching process if needed. If the current search rate limit is not less than the HUL, meaning current search rate limit is already equal to the maximum value, the search rate limit is not adjusted. If the current search rate limit is less than the HUL, indicating that additional resources of the microprocessor are available for allocation to the searching process if needed, flow continues to block 100. In block 100, the current search rate limit is increased.

Referring again to block 96, if the microprocessor is overloaded, flow continues to block 104 wherein the system determines whether the current search rate limit is greater than the LUL. If the current search rate is greater than the LUL, flow continues to block 106. In block 106, the current search rate limit is decreased, thus limiting the amount of resource available for the searching process. If the current search rate limit is not greater than the LUL, the current search rate limit is not further decreased and flow continues to block 108. However, because the microprocessor is overloaded and the current search rate limit cannot be further reduced without risking link stability, in block 108, the priority level of the lower priority tasks is adjusted to ensure at least minimal resources of the microprocessor are applied to these tasks. Adjustment of priority levels of tasks is discussed in further detail below.

After the current search rate limit has been evaluated, flow continues to block 110. In block 110, the system determines whether the current search rate is greater than or equal to the current search rate limit. If the current search rate is greater than or equal to the current search rate limit, flow continues to block 112. In block 112, the current search rate is reduced by incrementing the delay introduced by the microprocessor. If the current search rate is not greater than or equal to the current search rate limit, flow continues to block 114. In block 114, if the delay is non-zero, the current search rate is increased by decrementing the delay introduced by the microprocessor. The delay is only decremented to a minimum value of zero and any further attempts to decrement the delay result in the delay remaining zero.

Following adjustment of the delay, flow returns to block 92, where new search parameters are sent to the searching process according to the new delay value. The above-described process is then repeated.

Figure 7:
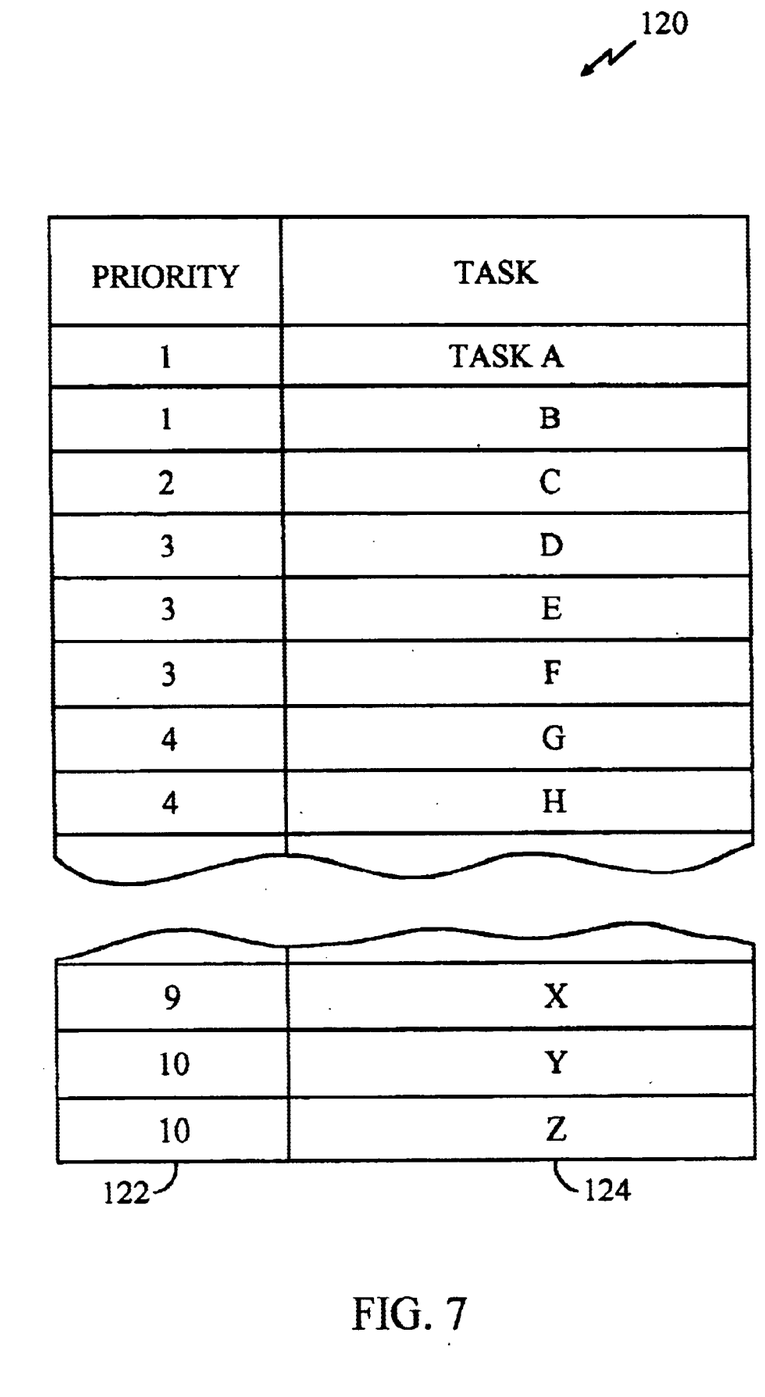
FIG. 7 is a chart showing an embodiment of a task priority table.

As discussed above, in region 80 of FIG. 5, resources of the microprocessor are not diverted from the searching process to other tasks. Therefore, in region 80 a large portion of resources of the microprocessor 40 may be consumed to the search engine 44, the data services module 48 and other high priority tasks if the microprocessor is overloaded. During such a condition, lower priority tasks may not receive the minimal required resources of the microprocessor 40 for proper operation of the remote unit. FIG. 7 is a chart of a priority table 120 illustrating the relationship between various tasks and their corresponding priority levels. The priority table 120 contains at least two columns, a priority column 122 and the associated task column 124. A lower value in the priority column 122 corresponds to higher level of priority. When the microprocessor is overloaded, the highest priority tasks, for example priority levels 1–3 comprising searching tasks, data services tasks and such, could consume excessive microprocessor resources and leave insufficient microprocessor resources for the remaining tasks in the priority table 120. In extreme cases, the lower priority tasks may be precluded from receiving any resources for an extended period of time. To alleviate this situation, these lower priority tasks selectively have their priority levels raised. Determining which of the lower priority tasks to raise in priority level can be accomplished many ways, such as, for example, they can be sequentially selected, randomly selected, or the least recently serviced can be raised or other techniques for selectively choosing a task which are well known in the art.

Therefore, through throttling the search rate, and selectively elevating the priority of lower level priority tasks, resources of the microprocessor 40 may be allocated so as to provide at least a minimal amount of resources of the microprocessor 40 for all tasks in the remote unit.

More information concerning the searching process, demodulating element assignment and search engines can be found in:

(1) U.S. Pat. No. 5,644,591, entitled Method and Apparatus for Performing Search Acquisition in a CDMA Communications System;

(2) U.S. Pat. No. 5,805,648, entitled Method and Apparatus for Performing Search Acquisition in a CDMA Communications System;

(3) U.S. Pat. No. 5,760,768, entitled Method and System for Customizing a User Interface in a Computer System;

(4) U.S. Pat. No. 5,867,527, entitled Method of Searching for a Bursty Signal;

(5) U.S. Pat. No. 5,764,687, entitled Mobile Demodulator Architecture For a Spread Spectrum Multiple Access Communication System;

(6) U.S. Pat. No. 5,577,022, entitled Pilot Signal Searching Technique for a Cellular Communications System;

(7) U.S. Pat. No. 5,654,979, entitled Cell Site Demodulation Architecture For A Spread Spectrum Multiple Access Communication Systems;

(8) application Ser. No. 08/987,172, entitled Multi-Channel Demodulator filed on Dec. 9, 1997; and (9) application Ser. No. 09/283,010, entitled Programmable Matched Filter Searcher, filed on Mar. 31, 1999;

each of which is assigned to the assigned hereof and incorporated herein by reference, in its entirety.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of controlling allocation of resources of a microprocessor for a wireless remote unit, the microprocessor controlling a searching task and other tasks, the method comprising:

(a) sending parameters to a search engine after causing a delay and prior to initiating a search;

(b) determining a loading of the microprocessor by counting a number of idle tasks that the microprocessor is controlling;

(c) if the microprocessor is not overloaded and the search rate is less than a search rate upper limit, increasing the search rate;

(d) if the microprocessor is overloaded and the search rate is greater than a search rate lower limit, decreasing the search rate;

(e) if the microprocessor is overloaded and the search rate is not greater than a search rate lower limit, increasing the priority of at least one other task;

(f) if the search rate is equal to or greater than search rate upper limit, then increasing the delay; and (g) if the search rate is not less than search rate upper limit, decreasing the delay.

2. The method as in claim 1 further comprising:

searching through a sequence of potential signal path offsets; and measuring the energy of a pilot signal received at each one of the potential path offsets.

3. The method as in claim 1 wherein causing the delay comprises inserting a delay, following an interrupt from the search engine indicating the completion of a search, before servicing the interrupt.

4. The method as in claim 1 wherein causing the delay comprises commanding the search engine to preform a dummy search of a desired duration and then ignoring the results of the dummy search.

5. The method as in claim 4 wherein commanding the search engine to preform a dummy search further comprises adjusting a search parameter.

6. The method as in claim 5 wherein adjusting the search parameter adjusted comprises increasing a search window size.

7. The method as in claim 5 wherein adjusting the search parameter comprises increasing an integration interval of the search.

8. The method as in claim 5 wherein adjusting the search parameter comprises increasing a number of non coherent passes in the search.

9. An apparatus for controlling allocation of resources of microprocessor for a wireless remote unit, the apparatus comprising:
 (a) means for sending parameters to a search engine after causing a delay an prior to initiating a search;
 (b) means for determining a loading of the microprocessor by counting a number of idle tasks that the microprocessor is controlling;
 (c) means for increasing a search rate if the microprocessor is not overloaded and the search rate is less than a search rate upper limit;
 (d) means for decreasing the search rate if the microprocessor is overloaded and the search rate is greater than a search rate lower limit;
 (e) means for increasing the priority of at least one other task if the microprocessor is overloaded and the search rate is not greater than a search rate lower limit;
 (f) means for increasing the delay if the search rate is equal to or greater than search rate upper limit; and
 (g) means for decreasing the delay if the search rate is not less than search rate upper limit.

10. The apparatus of claim 9 further comprising:
 means for searching through a sequence of potential signal path offsets; and
 means for measuring the energy of a pilot signal received at each one of the potential path offsets.

11. The apparatus of claim 9 further comprising means for causing the delay comprising means for inserting a delay, following an interrupt from the search engine indicating the completion of a search, before servicing the interrupt.

12. The apparatus of claim 9 further comprising means for causing the delay comprising means for commanding the search engine to perform a dummy search of a desired duration and then ignoring the results of the dummy search.

13. The apparatus of claim 12, wherein means for commanding the search engine to perform a dummy search comprises means for adjusting a search parameter.

14. The apparatus of claim 13, wherein means for adjusting the search parameter comprises means for increasing a search window size.

15. The apparatus of claim 13, wherein means for adjusting the search parameter comprises means for increasing an integration interval of the search.

16. The apparatus of claim 13 wherein means for adjusting the search parameter comprises means for increasing a number of non coherent passes in the search.

* * * * *